(12) United States Patent
Zapp

(10) Patent No.: US 8,695,858 B2
(45) Date of Patent: Apr. 15, 2014

(54) AIR VALVES FOR A WIRELESS SPOUT AND SYSTEM FOR DISPENSING

(76) Inventor: Achim Philipp Zapp, Shenzhen (CN)

( * ) Notice: Subject to any disclaimer, the term of this patent is extended or adjusted under 35 U.S.C. 154(b) by 121 days.

(21) Appl. No.: 13/227,418

(22) Filed: Sep. 7, 2011

(65) Prior Publication Data

US 2013/0056502 A1    Mar. 7, 2013

(51) Int. Cl.
*F16K 17/36* (2006.01)
(52) U.S. Cl.
USPC .............................. 222/500; 251/65; 137/38
(58) Field of Classification Search
USPC ........... 222/639, 484, 479, 478, 52, 113, 504, 222/500; 137/38, 39, 43; 251/65
See application file for complete search history.

(56) References Cited

U.S. PATENT DOCUMENTS

| | | | |
|---|---|---|---|
| 2,895,653 A | 7/1959 | Giepen | |
| 3,650,439 A * | 3/1972 | Shimooka | 222/445 |
| 3,827,467 A | 8/1974 | Henley et al. | |
| 3,920,149 A * | 11/1975 | Fortino et al. | 222/1 |
| 3,940,036 A | 2/1976 | Fortino | |
| 3,993,218 A | 11/1976 | Reichenberger | |
| 4,261,485 A * | 4/1981 | Borg | 222/500 |
| 4,265,370 A | 5/1981 | Reilly | |
| 4,349,042 A * | 9/1982 | Shimizu | 137/39 |
| 4,436,223 A | 3/1984 | Wilson | |
| 4,653,719 A | 3/1987 | Cabrera et al. | |
| 4,660,744 A | 4/1987 | Csaszar | |
| 4,736,871 A | 4/1988 | Luciani | |
| 5,044,521 A | 9/1991 | Peckels | |
| 5,255,819 A | 10/1993 | Peckels | |
| 5,255,822 A | 10/1993 | Mease | |
| 5,318,197 A | 6/1994 | Martindale et al. | |
| 5,379,916 A | 1/1995 | Martindale et al. | |
| 5,505,349 A | 4/1996 | Peckels | |
| 5,527,295 A * | 6/1996 | Wing | 604/254 |
| 5,603,430 A | 2/1997 | Loehrke | |
| 5,947,167 A | 9/1999 | Bogen et al. | |
| 6,036,055 A | 3/2000 | Mogadam et al. | |
| 6,220,484 B1 | 4/2001 | Martindale | |
| 6,394,411 B1 | 5/2002 | Hafner et al. | |
| 6,409,046 B1 | 6/2002 | Peckels | |
| 6,554,589 B2 | 4/2003 | Grapes | |
| 6,892,166 B2 | 5/2005 | Mogadam | |
| 7,272,537 B2 | 9/2007 | Mogadam | |

(Continued)

FOREIGN PATENT DOCUMENTS

CN    86103690 A    2/1987
DE    103 05 441 A1    9/2003

(Continued)

OTHER PUBLICATIONS

Office Action of Mar. 13, 2012 in related U.S. Appl. No. 12/117,230.

(Continued)

*Primary Examiner* — Paul R Durand
*Assistant Examiner* — Charles P Cheyney
(74) *Attorney, Agent, or Firm* — Kilpatrick Townsend & Stockton LLP

(57) ABSTRACT

Embodiments of the present invention provide a pouring device for a container for the dosing of liquid. The pouring device has an improved air valve system that works via cooperation between a weighted magnetic component and a metal ball in order to control opening and closing of the air valve inlet.

14 Claims, 8 Drawing Sheets

(56) References Cited

U.S. PATENT DOCUMENTS

| | | |
|---|---|---|
| 7,900,799 B2 | 3/2011 | Kuzar |
| 8,410,753 B2 | 4/2013 | Opolka |
| 2001/0011025 A1 | 8/2001 | Ohki et al. |
| 2002/0171559 A1 | 11/2002 | Yang |
| 2004/0210405 A1 | 10/2004 | Mogadam |
| 2004/0211790 A1 | 10/2004 | Werth |
| 2005/0263547 A1 | 12/2005 | Jensen et al. |
| 2006/0027268 A1 | 2/2006 | Zapp |
| 2009/0230157 A1 | 9/2009 | Lindberg |
| 2009/0277931 A1 | 11/2009 | Zapp |
| 2010/0174337 A1 | 7/2010 | Stahmann |
| 2011/0016968 A1* | 1/2011 | Eichholz et al. .................. 73/203 |
| 2011/0036873 A1 | 2/2011 | Peckels |
| 2011/0255996 A1* | 10/2011 | Wickstead et al. .............. 417/53 |
| 2011/0309103 A1 | 12/2011 | Heatherly et al. |

FOREIGN PATENT DOCUMENTS

| | | |
|---|---|---|
| EP | 1227058 A1 | 1/2002 |
| GB | 582032 A | 11/1946 |
| GB | 1001208 A1 | 8/1965 |
| JP | 2000-161533 A | 6/2000 |
| WO | 86/07625 A1 | 12/1986 |
| WO | 93/19349 A1 | 9/1993 |
| WO | 2007/144002 A1 | 12/2007 |
| WO | WO 2011/133783 A2 | 10/2011 |

OTHER PUBLICATIONS

International Search Report mailed on Jun. 18, 2009, for PCT Patent Application No. PCT/CN2009/000280, 7 pages.
Non-Final Office Action mailed on Mar. 14, 2011 for U.S. Appl. No. 12/117,230, 5 pages.
U.S. Appl. No. 13/227,408, filed Sep. 7, 2011 for Zapp.
Office Action mailed Jul. 19, 2013 in related U.S. Appl. No. 13/227,408.
Office Action mailed Sep. 23, 2013 in related U.S. Appl. No. 12/117,230.
International Search Report and Written Opinion mailed Jun. 18, 2009 in International Patent Application No. PCT/CN2009/000280, 10 pages.
International Search Report and Written Opinion mailed Mar. 15, 2013 in related International Patent Application No. PCT/US2012/053917, 11 pages.
International Search Report and Written Opinion mailed Feb. 15, 2013 in PCT Application No. PCT/US2012/053955, filed Sep. 6, 2012, 9 pages.
Office Action mailed Apr. 8, 2013 in related Chinese Application No. CN 200980117618.3 (plus English Abstract and English machine translation).

* cited by examiner

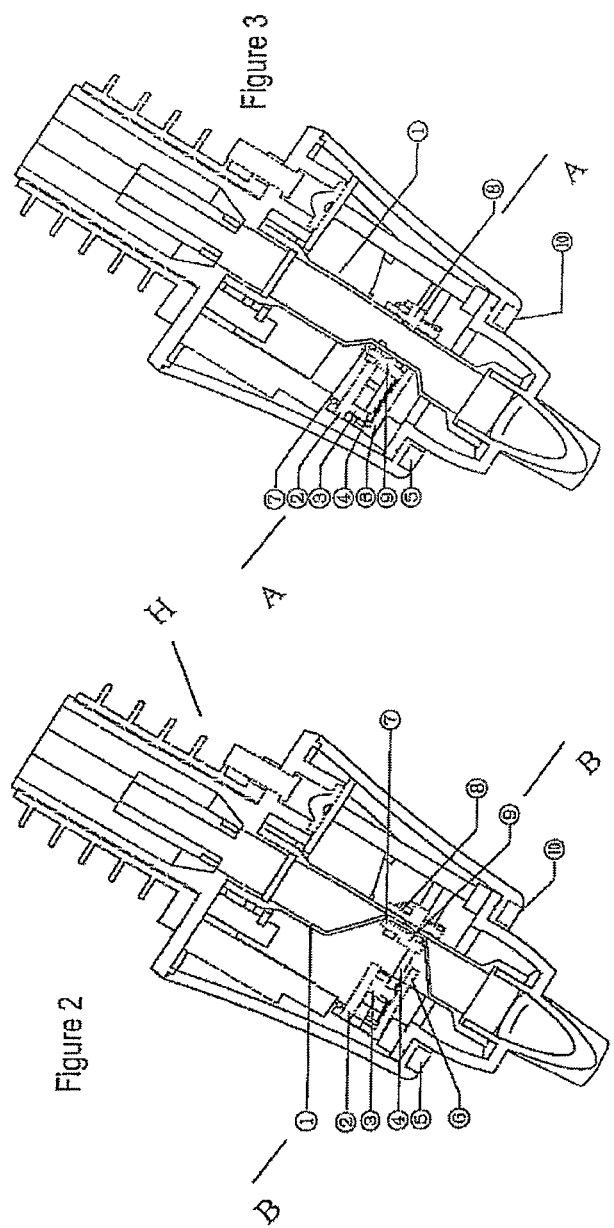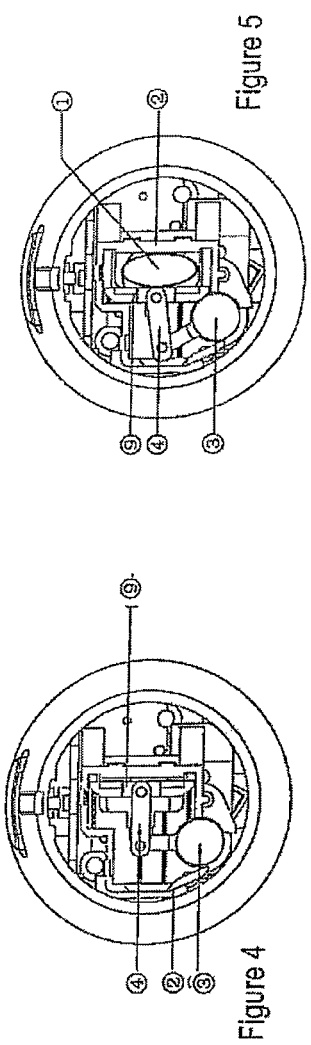

AIR VALVES FOR A WIRELESS SPOUT AND SYSTEM FOR DISPENSING

FIELD OF THE INVENTION

Embodiments of the present invention relate generally to systems for monitoring the amount of liquid poured from liquid containers. Further embodiments relate to improved air valve systems for appropriate dispensing of the liquid.

BACKGROUND OF THE INVENTION

The amount of liquid dispensed from liquid containers needs to be monitored for many endeavors today. For instance, the management of establishments has long found it necessary to carefully monitor the relationship between liquor dispensed and receipts by controlling the quantity of liquor dispensed from a specific bottle and recording the sale.

A few systems have been proposed to date for measuring and recording the amount of liquid dispensed from liquid containers. One such system includes a spout that is configured to attach to an opening of a liquid container. This spout also uses a portion-control mechanism to control the desired amount of liquid poured from the liquid container. The spout includes a radio transmitter for emitting signals containing activity information. A receiver receives the transmitted signals, and provides these signals to a computer at the establishment that processes the signals into text for viewing.

FIG. 1 shows side-cross sectional view of a free-pour spout shown in US2004/0210405 or related U.S. Pat. No. 6,892,166. This spout is used to be mounted on an open orifice of a liquid container and measures the amount of liquid poured from the liquid container. The spout includes a rigid fluid-flow passageway 305, a breather tube 310, a printed circuit board (PCB) 315 with a number of electronic components, a battery (not shown), an LED (not shown), and an engage switch 340 (including seal/sense switch 350, a spring-biased button 345). Reference numeral 306 shows the direction of fluid flow. The dimensions of the fluid-flow passageway are specifically selected to ensure laminar fluid flow of liquid when the liquid-container (and hence the spout) are inclined at a certain angle (e.g., 20 degrees) past the horizontal axis of the liquid-container. It also has a detection circuit that detects fluid flow through the passageway. In addition, this spout has a measuring circuit that generates data relating to fluid flow when the detection circuit detects fluid flow through the passageway.

In US2004/0210405, a RF Transceiver is provided to communicate with an outside master unit for dispensing data. To measure the pour, a detection circuit is provided to detect a pour event. US2004/0210405 also discloses a breather tube that provides an air inlet (vent) 307 that allows better fluid flow through the passageway. An engage switch (bottle presence bottom) is formed by an on-off button that springs up and seals a sense switch on the PCB when the bottom portion is inserted into a liquid container. When the bottom portion is removed from the liquid container, the on-off button springs back and thereby opens the sense switch.

The spout in U.S. Pat. No. 6,892,166 is free-pour, and it only measures the amount of liquid poured. There is, however, a need to pour the liquid in a controlled and predetermined amount. To avoid excess liquid being poured, an additional control unit outside is necessary to stop it. For example, the system includes an external computer that gathers the data collected by the local computers of the establishments monitored by the system. In some embodiments, the external computer is located outside of all the establishments, while in other embodiments the computer is located within one of the establishments. Even with this additional control unit outside, due to a control time lapse and difference in position between detection and control, it is unlikely to have precise control in pouring of liquid.

US2005/0263547 describes a pouring stopper. In this pouring stopper, a magnetic force within the stopper is provided by a coil which affects an armature so that a gasket at both ends of the rod may be caused to assume two positions. The first position allows filling of liquid from a bottle into a liquid chamber, and the second position is intended to empty the liquid chamber. The magnet arrangement itself, which consists of a coil and a spring-biased armature, is seated in an extension of the liquid chamber. The coil itself is seated externally on a bottle holder, which means that the pouring stopper cannot be used for hand pouring.

WO2007/144002 discloses a pouring stopper for a container, the pouring stopper being opened and closed on the basis of a magnetizable rod or plate moved by a coil. The coil and the magnetizable rod or plate are disposed within the liquid chamber. However, the magnetizable rod and coil use power the entire time that the spout is open, which requires high power consumption. Additionally, the electronic parts are not liquid proof, risking the chance that the liquid may wet or dampen them.

However, due to the large size of the magnetizable rod and the coil to move the magnetizable rod, there is a need for a compact and simple pour apparatus that measures the amount of dispensed liquid in a controlled fashion without requiring manual activation.

Moreover, due to the compact and non-disassemble-able nature of the spout in U.S. Pat. No. 6,892,166, when the energy of the battery is used up, the entire spout should be disposed. Therefore, there is also a need to provide options that allow for reuse of the spout. The embodiments described herein provide options for recharging the battery.

Additionally, it would be advantageous to provide a pouring device with an improved air valve system that allows the spout to be positioned on a full bottle, without causing an imprecise first pour due to liquid that may flow into the air valve during introduction of the spout onto the bottle opening. It is further desirable to provide an improved air valve that closes the air inlet as quickly and efficiently as possible after a pour event.

BRIEF SUMMARY OF THE INVENTION

One of the benefits provided by embodiments of the invention described herein is that a silicone tube inside the spout is a path for the liquid to pass through from the bottle without any restrictions. Meanwhile, the rest of the components are protected or isolated from liquid and are thus per se not necessary to be liquid-resistant or liquid-proof. This also guarantees a quick and controlled flow of the liquid and avoids any air bubbles to influence the pour precision.

The silicone tube can be easily squeezed to stop the liquid flow. This can be done by a stepping motor, a motor with gearbox, or any other motor or appropriate mechanism.

To ensure that the dosing of liquid from the pour spout is uniform and accurate, it is advantageous that a liquid indicator is sealed into the silicone tube. This makes it possible to register liquid flowing out of the pourer during the entire period of time, whether pre- or not pre-determined.

Specific embodiments of invention generally provide a pouring device for a container for the dosing of liquid, the pouring device including: a) a housing; b) a passage for the liquid within the housing; c) an electrical operated opening/ closing mechanism for opening or closing the passage for dosing of a predetermined or registerable amount of liquid, wherein the passage comprises a silicone tube, and the opening/closing mechanism blocks the silicone tube by squeezing the silicone tube in order to close the passage. The silicone tube is normally closed, and the dosing of liquid is activated by the opening/closing mechanism. The silicone tube is enclosed and pressed by a slide in the normally closed condition. The opening/closing mechanism may be operated by a motor.

The pouring device may further have an air inlet valve that is opened for pouring and closed in non-pouring status, driven by motor action. The device may further feature an improved air valve system that works via cooperation between a weighted magnetic component and a metal ball in order to control movement of the metal ball, which opens and closes the air valve inlet opening.

The pouring device may further have a measuring circuit with multi-angle detection that generates data relating to fluid flow through the passage when the detection circuit detects a pour event. The multi-angle detection is different than the known one or two angle detection. With such multi-angle detection, once the tilt process has started, the flow rate can be exactly determined by the measuring circuit such as every 250 ms permanently. To reach the desired pouring quantity, the pouring by opening the silicone tube will be delayed/adjusted according to the bottle tilt position.

In one embodiment, there is provided an air valve for use with a pouring device for the dosing of liquid from a container, the air valve including: (a) an air valve channel and an air vent tube, the air vent tube comprising an air inlet opening at one end; (b) a weighted magnetic component comprising a magnet portion and a weighted portion; the weighted magnetic component positioned in the air valve channel; (c) a metal ball positioned at the air inlet opening of the air vent tube; wherein a magnetic force between the magnetic portion of the weighted magnetic component and the metal ball maintains the metal ball in a first position, and wherein when the air valve is tilted to a certain degree, gravity overcomes the magnetic force and pulls the weighted magnetic component away from the metal ball, allowing the metal ball to move to a second position. In a further embodiment, there is provided a pouring device for a container for the dosing of liquid, the pouring device including: (a) a spout housing configured to seal an opening of the container; (b) a conduit extending through the spout housing for liquid passage through the housing; (c) an electrically operated valve disposed within the spout housing for selectively clamping the conduit so that a registerable amount of liquid can be dosed; and (d) an air valve configured to be secured to the spout housing, the air valve comprising an air inlet opening, a weighted magnetic component, and a metal ball, wherein when the pouring device is positioned on a container in an upright position, a magnetic force maintains the metal ball in place over the air inlet opening.

BRIEF DESCRIPTION OF THE DRAWINGS

FIG. 2 is the longitudinal section of the pouring device in accordance with one embodiment of the present invention shown in a closed position.

FIG. 3 is the longitudinal section of the pouring device in accordance with one embodiment of the present invention shown in an open position.

FIG. 4 is the cross-section of the pouring device of FIG. 2 along B-B in a closed position.

FIG. 5 is the cross-section of the pouring device of FIG. 3 along A-A in an open position.

DETAILED DESCRIPTION OF THE INVENTION

Figure 1:
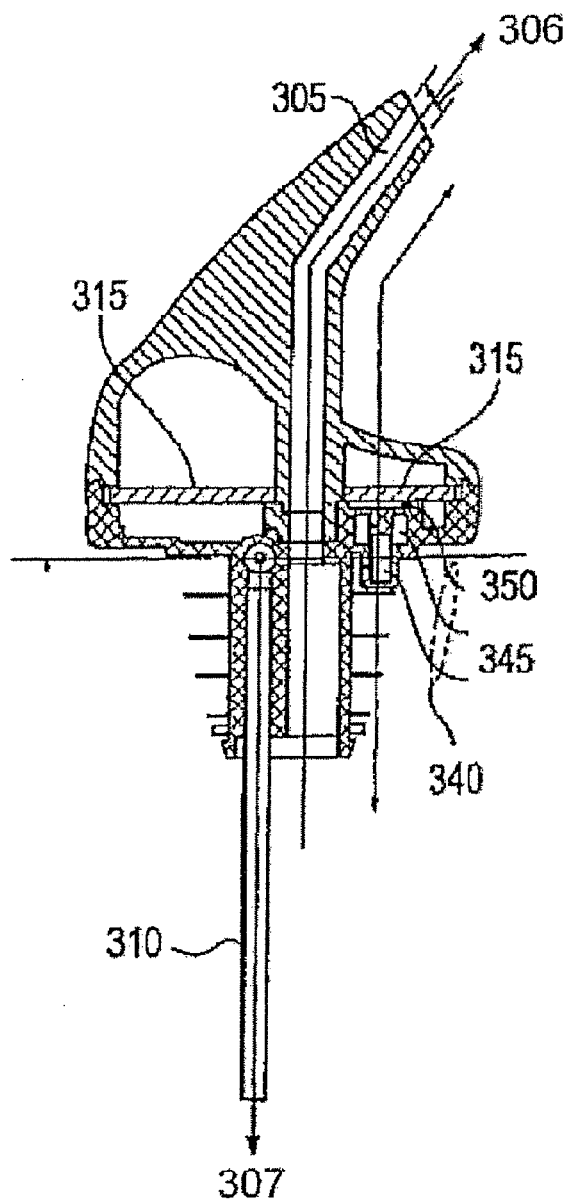
FIG. 1 shows the side-cross sectional view of a free-pour spout in US2004/0210405 or U.S. Pat. No. 6,892,166.

FIGS. 2-5 show a pouring device mounted onto a container (not shown) for dosing of a liquid. The pouring device has a compact housing H configured to seal an opening of the container. A passage (which is at least one portion being in the form of a flexible silicone tube 1 is provided within the housing H for liquid to pass through. An opening/closing mechanism disposed within the compact housing opens or closes the passage in order to dose a predetermined or registerable amount of liquid. In order to close the passage, the silicone tube 1 is squeezed/pressed by the opening/closing mechanism to block the passage. The passage/silicone tube is preferably normally closed as shown in FIG. 2 (but it might be normally open in some cases), and the dosing of liquid is activated by the opening/closing mechanism, which is controlled by a microprocessor (not shown) within the housing.

To ensure that the dosing of liquid from the pour spout is uniform and accurate, it is advantageous that a liquid indicator (not shown) is sealed inside the bottom housing (FIG. 6 & FIG. 7), making it possible to register whether liquid flows out of the pourer during the entire period of time which is pre-determined.

As shown in FIG. 2, the silicone tube 1 is enclosed and pressed by a slide 9 and a slide guide 2 (box bottom) and 6 (box top). The opening/closing mechanism is in a normally closed condition (as shown in FIG. 4). FIG. 5 shows the tube in an open position. A motor and a gearbox (not shown) are provided to activate the opening/closing mechanism. The function of the opening/closing mechanism is similar to a pinch valve (see e.g., U.S. Pat. No. 6,554,589), which includes a clamp mechanism operative to clamp a piece of flexible tubing. Generally a clamp or plunger will squash the tubing flat against a surface to cut off the flow of fluid through the tube.

In one embodiment, to close the tube or stop the pouring, the motor turns, for example, clockwise (i.e. from FIG. 5 to FIG. 4), an arm head 3 (rotated by the motor) presses the slide 9 via a pivotally link lever 4 to close the tube 1 into a closed position where liquid is stopped. When the motor turns anticlockwise (that is, from FIG. 4 to FIG. 5), the arm head 3 is released via the pivotally link lever 4 such that the slide 9 is moved away by the motor and gearbox force to open the tube 1, i.e., in an open position where liquid is dispensing. Moreover, opening of the tube is also due to pressure from the flowing fluid and by the elastic nature of the flexible tube 1 springing back into shape. In the case of dispensing sugar-containing products, the silicone tube walls might glue or otherwise stick together, preventing the tube from going back to its original open position. To avoid this, the outer parts of the silicone tube may have one point fixed 8 (Silicone holder-B) and the other point 7 (Silicone holder-A) that moves always with the slide 9 to enforce the opening of the silicone tube by the slide 9 driven by the motor. The motor is preferably a coreless permanent magnetic DC motor.

In a further embodiment, a pair of springs (not shown) may be positioned between the slide 9 and the slide guide and the arm head 3, directly contacting the slide 9 (i.e., without the pivotally link lever 4) such that in order to open the tube, the slide 9 is pushed away the tube 1 by the pair of springs. Similarly, to close the tube 1 the arm head 3 rotated by the motor and gearbox force would contact the slide 9 against the springs.

In certain embodiments, the opening/closing mechanism may be further controlled by a watch that is worn by the operator until an authorized signal of the watch is received. RF Transceiver in the pouring device may send data together with such authorized signal. Therefore, the system can record who handles such pour.

Figure 8:
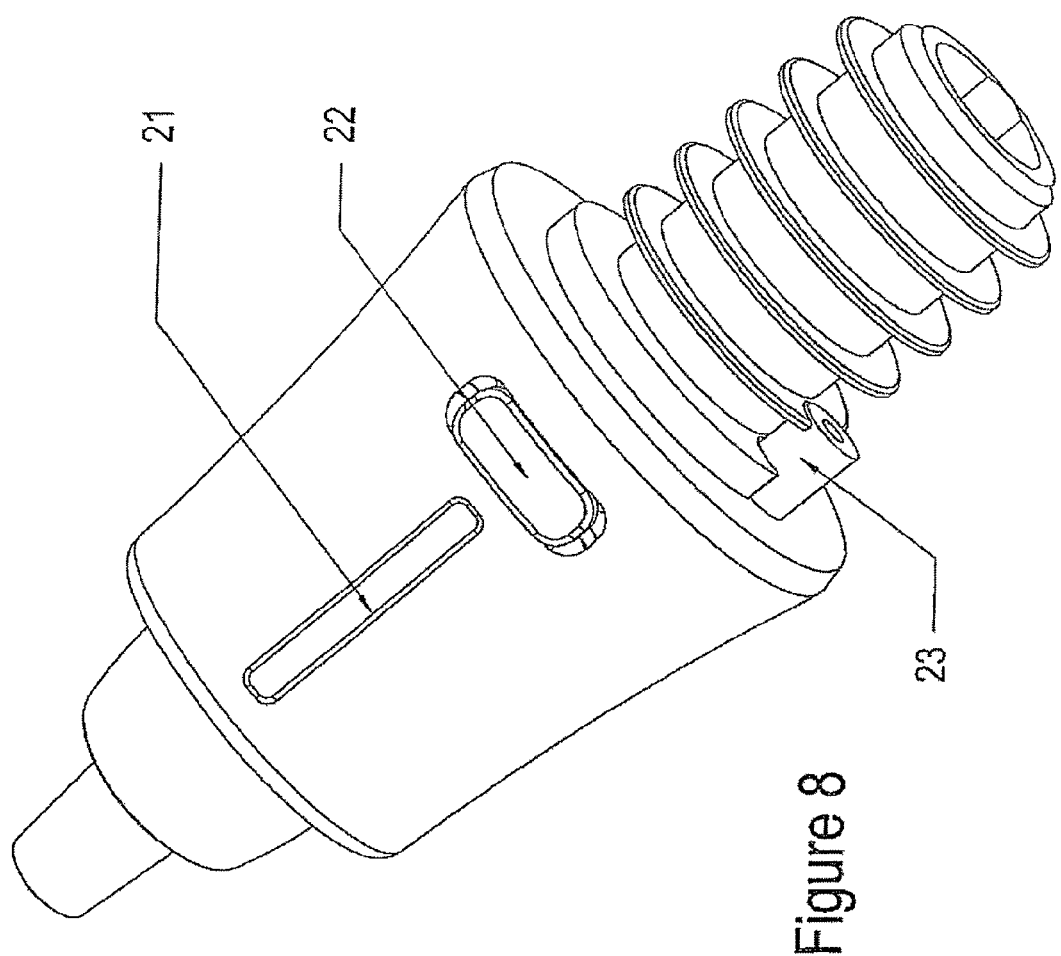
FIG. 8 is a side perspective isometric of the pouring device of FIG. 2.
Figure 9:
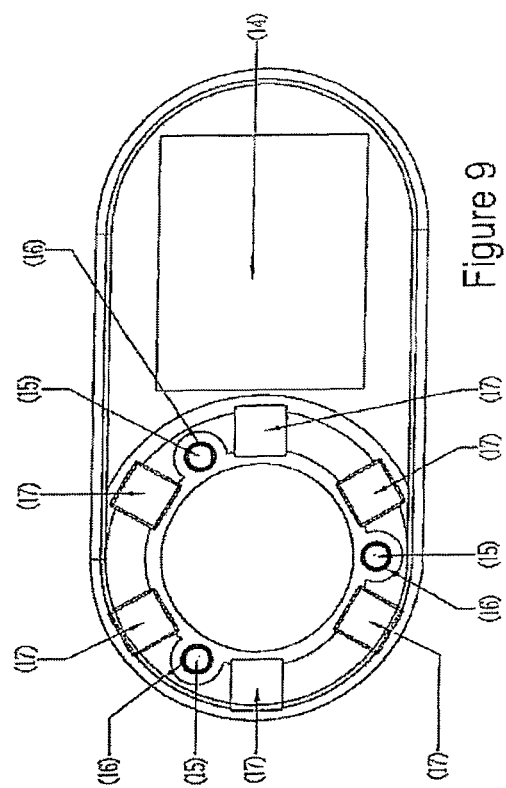
FIG. 9 is the cross-section of a charger for the pouring device.
Figure 10:
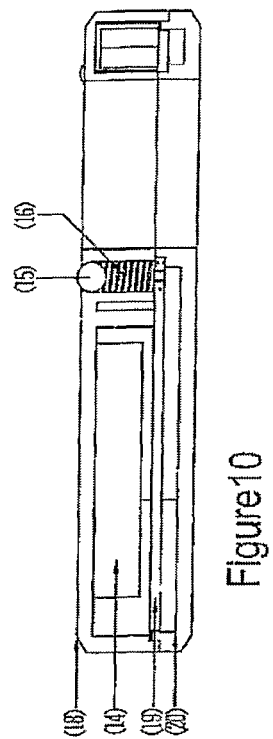
FIG. 10 is the longitudinal section of the charger in FIG. 9.
Figure 11:
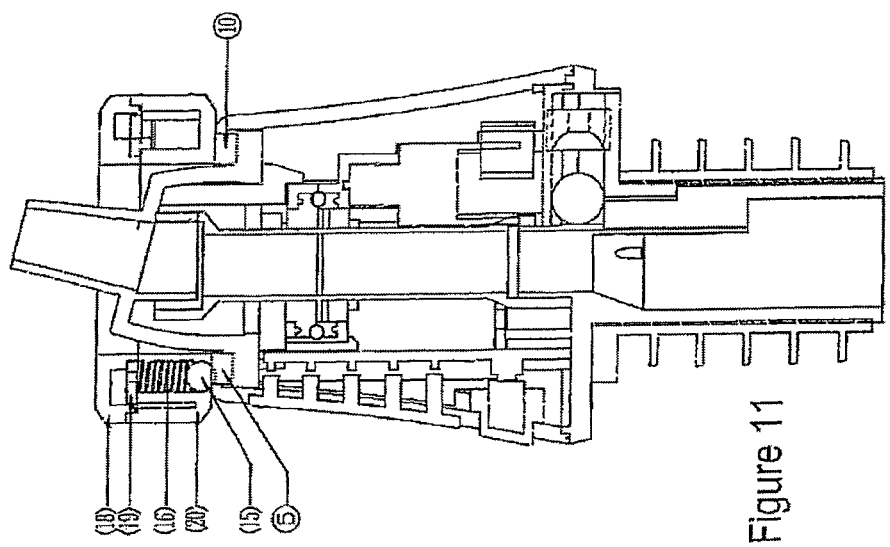
FIG. 11 is the longitudinal section of the charger used with the pouring device.

As shown in FIG. 8, a bottle presence sensor 23 (similar to that described in US2004/0210405) is provided to send an alarm signal when the spout is on or off the bottle, to avoid any pouring without the pouring device. However, due to the compact and non-disassemble-able of the spout described in U.S. Pat. No. 6,892,166, when the energy of the battery is used up, the whole spout needs to be disposed. Therefore, there is a need to be able to reuse the spout, such as by recharging the battery. However, if a power input port is provided on the housing, there is a risk of damaging the electronic parts inside. Thus, as shown in FIGS. 9, 10 and 11, a pair of metal inserts 5 (Charge metal-A) and 10 (Charge metal-B) are provided on the housing for a mobile charger (not shown) to be attached to the spout to charge the battery inside the spout. In a specific embodiment, metal inserts 5 and 10 may be a pair of metal rings or arcuate contacts (in a particular embodiment, the contacts may be steel) on the spout, such that a mobile charger with magnets may be attached to the spout.

A liquid detection indicator is also provided to ensure that the dosing of liquid from the pour spout is uniform and accurate. In accordance with embodiments of the present invention, it is advantageous that the liquid detection indicator is sealed into the bottom housing, as this makes it possible to register whether liquid flows out of the pourer during the entire period of time which is pre- or not pre-determined.

As shown in FIG. 8, the pouring device may be provided with an indicator 21 (such as a series of LEDs) and an activation/selection button 22. The activation/selection button 22 can be silicone rubber which is pressed by a user's finger to actuate the pouring device or to have any selection by consecutive pressing as indicated by the indictor 21. However, to make the pouring device more water-proof and avoid any pressing stuck by sugar-containing products, a touch-sensor may be used as activation/selection button 22.

Figure 7:
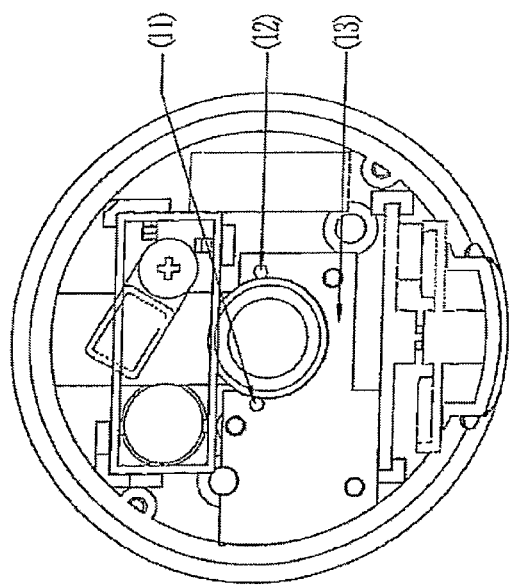
FIG. 7 is the cross-section of the pouring device of FIG. 6.
Figure 6:
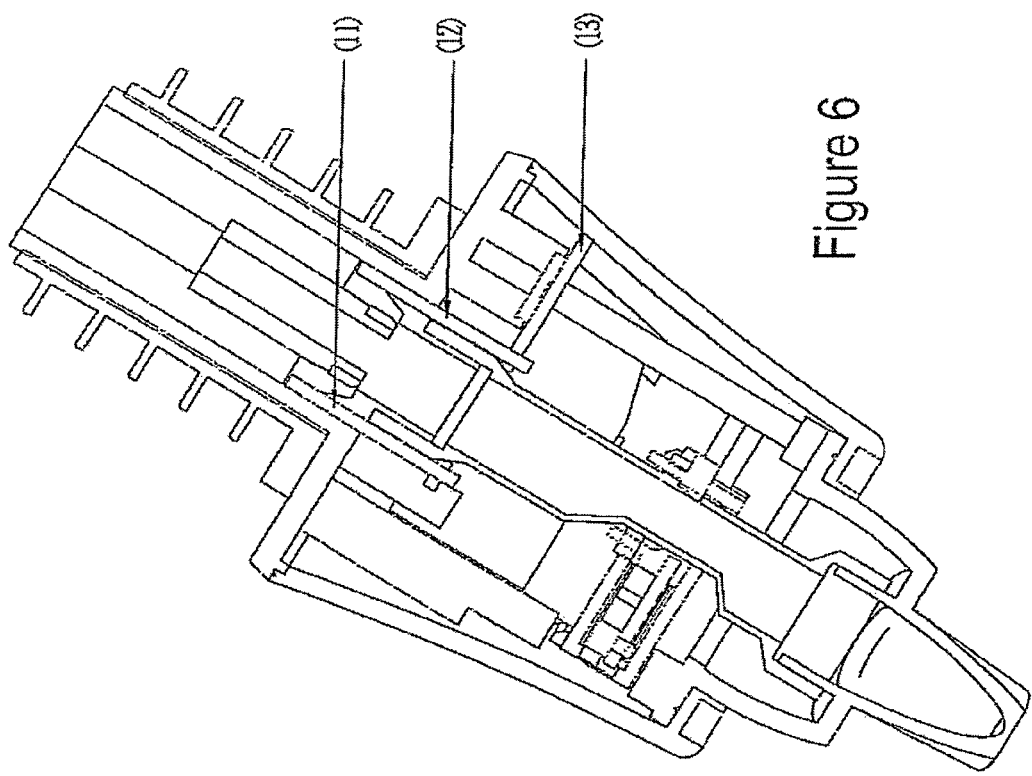
FIG. 6 is the longitudinal section of the pouring device of FIG. 3 showing the position of liquid presence detectors.

FIGS. 6-7 show the position of liquid presence detectors 11, 12 around the silicone tube. A PCB 13 for liquid presence detectors is also provided. FIGS. 9-11 show a mobile charger used for the pouring device. The charger box bottom is denoted by 18 and the charger box top is denoted by 20. The charger comprises a charger housing with a shape adapted to be mounted on the pouring device (see FIG. 10) to recharge the battery of the pouring device. That is, charger housing has a cavity for the pouring device to be passed through. Around the cavity, several magnets 17 are provided so as to mount the charger firmly to the pouring device by magnetic force with metal inserts 5 and 10 on the pouring device. As in the usual, a charger circuit (indicated as PCB 19) and a battery 14 are provided. Therefore, three circumferentially-spaced charging points are able to detect the two metal inserts in any position such that the pouring device can be recharged in any place by the charger remotely to any electrical power. After the charging of the pour device, the charger can be removed, and then mounted to another pouring device until the power is used up or placed back in recharging station. This allows the pouring device to be recharged remotely, away from a power source. The electric contact between the pour device and charger is via the metal inserts 5 and 10 and the spring contacts (i.e. comprised by metal ball (e.g. steel ball) 15 and spring 16).

Another benefit provided by embodiments of this invention is an improved air valve system. Traditional pour spouts have air valves that are made out of two parts—a housing and a metal ball. The housing is typically made of ABS (acrylonitrile-butadiene-styrene), which is a plastic that can be easily molded or extruded. The housing has an air inlet opening that can be covered or uncovered by the metal ball. The function of the metal ball is to allow an air stream to flow into the air inlet opening during pouring (to displace the liquor or liquid being poured) and to close the air stream by nesting in a seat formed at the air inlet opening when the pouring has stopped. The main purpose of the air valve is to close the air inlet opening in the air valve as quickly as possible after pouring has stopped, to prevent any liquid from running into the air tube (that connects the air valve to the pour spout), when the bottle is returned to the upright position.

When spouts having current air valves are positioned on a new bottle that is completely full, the metal ball may be moved into the open position. For example, many full bottles have an initial liquid level that is higher than others due to varying bottle neck lengths in existence. If the liquid is so high in the bottle that the air valve (which is positioned at the lower portion of the spout) touches the liquid, the pressure of the liquid up against the ball will cause it to lift from the seat in the air inlet opening. This movement of the ball opens the air inlet opening, which allows liquid to flow into the air tube to at least the same level as the liquid in the bottle. The result is that the first pour will be not be precise because the incoming air must push the liquid out of the air tube, which slows down the air flow through the valve into the bottle, to displace the liquor being poured.

Figures 12, 13:
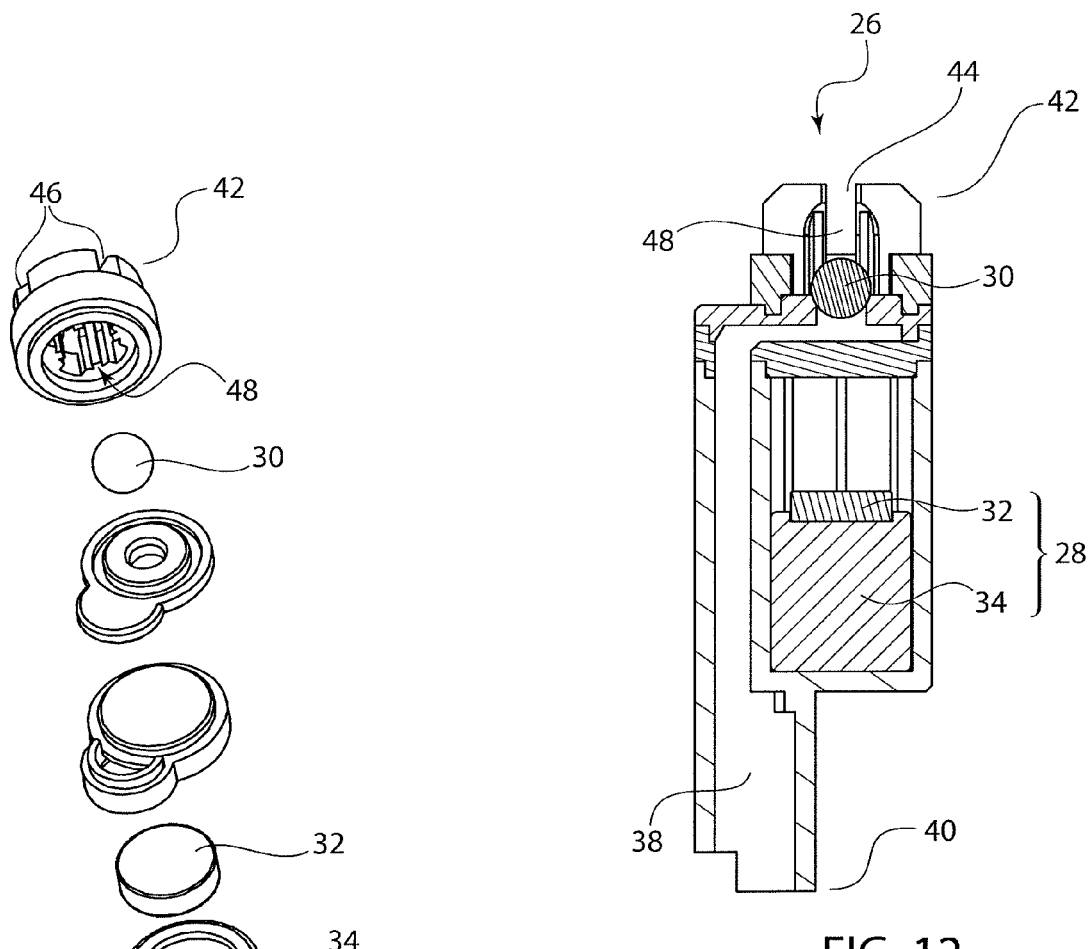
FIG. 12 shows a cross sectional view of an improved air valve.
FIG. 13 shows an exploded view of the air valve of FIG. 12.

Accordingly, improved air valve 26 helps prevent these problems. As shown in FIG. 12, the air valve 26 has a slidable weighted magnetic component 28 in addition to a metal ball 30. In the specific embodiment shown, the slidable weighted magnetic component 28 may comprise a separate magnet portion 32 and a weighted component 34. The magnet portion 32 and the weighted component 34 may be secured to one another via an adhesive means, via magnetic force, welded, or any other appropriate securing mechanism or system. The magnet 32 is configured to be securable to the weighted component 34 so that the two parts move together. Alternatively, the slidable weighted magnetic component 28 may be an integral one-piece unit formed of at least a portion of magnetic material, such that a magnetic portion 32 is positioned at the ball-facing side of the component 28.

Figure 16:
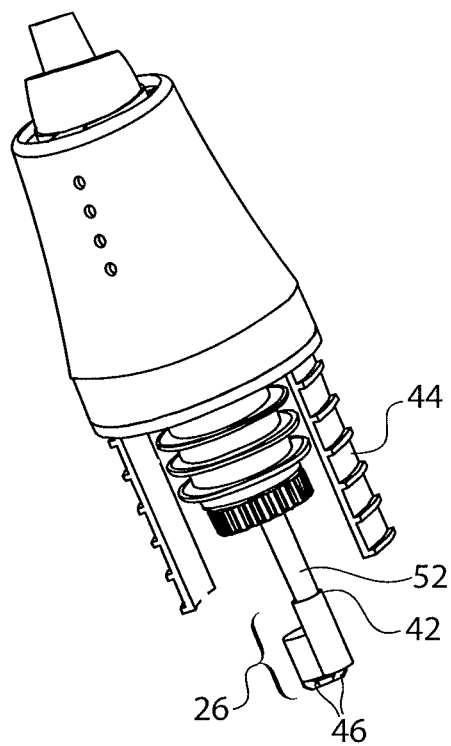
FIG. 16 shows a perspective view of a spout having an attached air valve.

Air valve 26 also features an air valve channel 36 in which the slidable weighted magnetic component 28 is positioned. Component 28 should be freely slidable within air valve channel 36, such that when air valve 26 is inverted, the component 28 will move from one end of the channel 36 to the other. Air valve 26 also features an air vent tube 38, which has a spout cooperating end 40 and liquid facing end 42. An air inlet opening 44 is positioned at the liquid facing end 42, and allows air to enter the air vent tube 38 (when the ball 30 moves away from the inlet opening 44). As shown in FIGS. 13 and 16, one or more air vents 46 may be positioned along the sides of the liquid facing end 42. The air inlet opening 44 leads into a ball channel 48 in which the metal ball 30 is allowed to move in order to open and close the air inlet opening 44.

Figure 14:
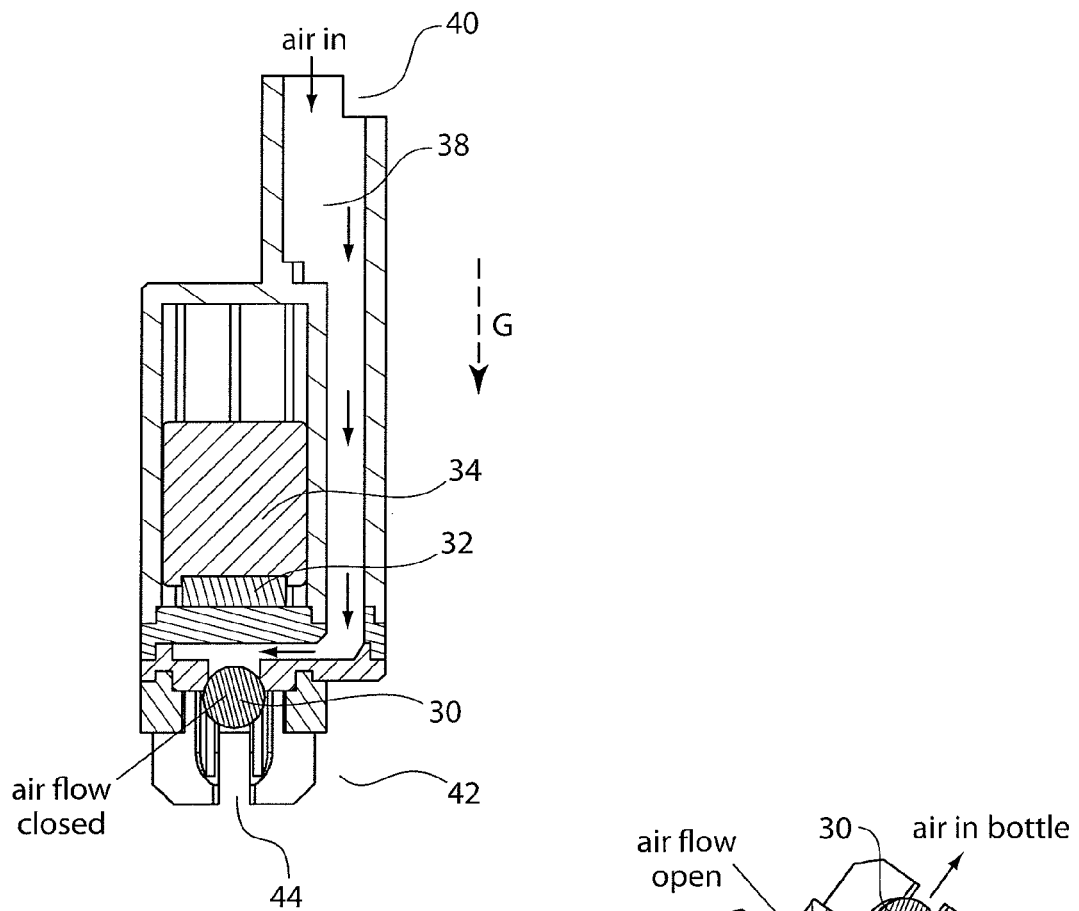
FIG. 14 shows a cross-sectional view of an improved air valve in the position it would take when located at the base of a spout positioned on an upright bottle.

The weighted magnetic component 28, and particularly the magnet portion 32 of component 28, helps secure the metal ball in place. When the air valve 26 is positioned at the end of a spout inlet, as shown in FIG. 16, and when that collective assembly which is positioned on a bottle with the air valve in the orientation shown in FIG. 14, the magnet portion 32 holds the metal ball 30 in place (e.g., in a first position) to close the air inlet opening 44, preventing external air from entering the bottle through the air vent tube 38 when the bottle is upright (i.e., not in the pouring position).

Figure 15:
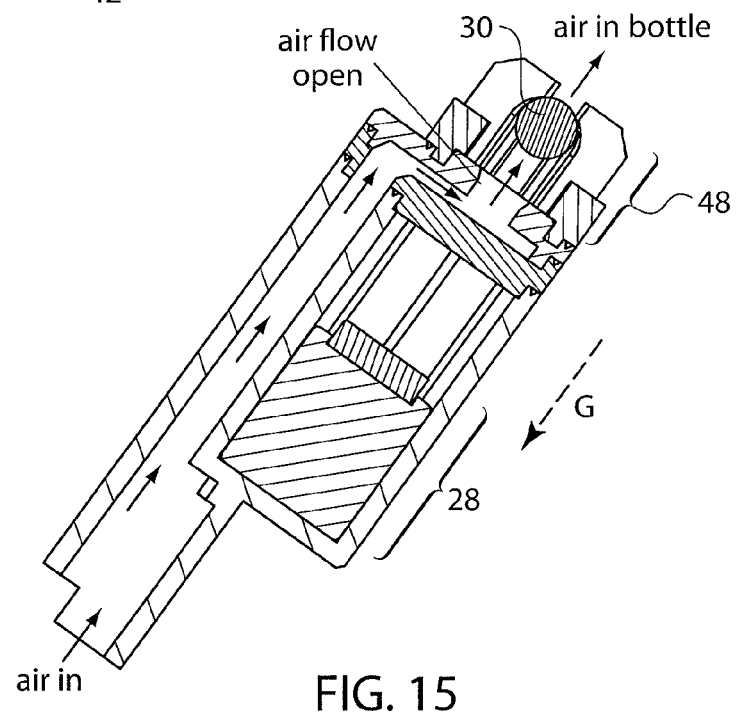
FIG. 15 shows a cross-sectional view of the air valve of FIG. 14 in a pouring position.

The magnet portion 32 is attached to (or integrally formed with) a weighted component 34, which may be a generally circular, heavy piece of metal which is generally tubular or hollow in shape, as shown in FIG. 13. However, it should be understood that component 34 may also be formed from a solid element and/or or may be any appropriate shape (e.g., oval, cylindrical, spherical, square, triangular, or so forth), as long as it can freely slide in channel 36. The combined heavy metal piece and magnet form a component 28 that freely slides inside the air valve channel 36 during inclination of the bottle. As the bottle is initially being inverted at just a small angle, the magnet portion 32 holds weighted magnetic component 28 to the ball 30 via magnetic force. This weight keeps the ball in place in the first position. After reaching an optimal pouring inclination, as shown in FIG. 15, the weight of the weighted magnetic component 28 overcomes magnetic force and the slidable weighted component 28 slides downward with gravity "G." The metal ball 30 is now released from the magnet portion 32 and allowed to move to a second position, e.g., to move freely in the ball channel 48. This allows air to flow freely through the air valve assembly 26, allowing the pouring process of the spout to begin.

Using a weighted piece of heavy metal 34 as part of component 28 helps keep the size of the valve as small as possible. By using a dense/heavy material, the sealing function can occur as quickly as possible, using the smallest component possible. It also helps close the air inlet opening in the air valve as quickly as possible after pouring has stopped, preventing any liquid from running into the air tubing (that connects the air valve to the pour spout), when the bottle is returned to the upright position.

Figure 17:
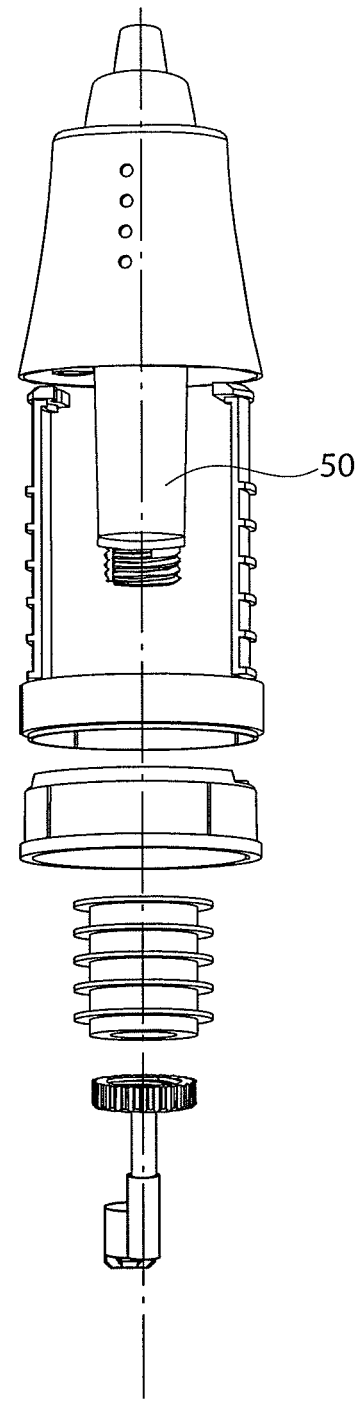
FIG. 17 shows an exploded view of a spout having an air valve secured to the base of the spout.

In one embodiment, as shown in FIGS. 16 and 17, the air valve 26 is attached to a spout inlet 50 by a small piece of tubing 52 that is interference fit against both the bottle facing end 42 of the air valve and into an inlet hole inside the spout's main liquor inlet. In a particular embodiment, the tubing may be a PVC tubing that is about 0.1 to about 0.3 inches in diameter and about 1.0 to about 2.0 inches long. In an even more particular embodiment, the tubing is about 0.160 inches in diameter and about 1.125 inches long. An example of the configuration is shown in FIG. 16.

On FIG. 13, the component beneath the ball is a cap with a hole or orifice that allows the ball to seat against the cap. Below the cap is a protective cap for the slide, which seals the channel and keeps it dry by preventing liquid from entering the area.

During installation of a spout having an air valve 26 secured thereto onto a full bottle, the metal ball 30 closes off the air inlet opening 44 due to the magnetic force between the magnetic portion 32 and the ball 30. When the spout is being inserted onto a full bottle, the air between the liquid surface and the spout is compressed. If this over pressure is not released, liquid will not come out of the spout for the first pour. Thus, the spout is automatically opened about 1 mm during bottle replacement from the empty bottle to a full bottle, allowing pressure build-up during spout insertion to be relieved. When the spout's bottle sensor switch touches the full bottle's mouth, the spout is closed and precise pouring can start.

It is understood, therefore, that the invention is capable of modification and therefore is not to be limited to the precise details set forth. Various modifications, additions, and deletions may be made in the details within the scope and range of equivalents of the claims without departing from the spirit of the invention and the following claims.

What is claimed is:

1. An air valve for use with a pouring device for the dosing of liquid from a container, the air valve comprising:
    (a) an air valve channel and an air vent tube, the air vent tube comprising an air flow inlet opening at one end;
    (b) a weighted magnetic component comprising a magnet portion and a weighted portion; the weighted magnetic component positioned in the air valve channel;
    (c) a metal ball positioned at the air inlet opening of the air vent tube;
    wherein when the air valve is in an upright position, a magnetic force between the metal ball and the weighted magnetic component causes the metal ball to close the air inlet, and wherein when the air valve is tilted to a pouring position, the weighted magnetic component slides away from the metal ball, allowing air to flow into the air inlet.

2. The air valve of claim 1, wherein when the air valve is positioned on a pouring device placed on a container in an upright position, the magnetic force maintains the metal ball in place over the air flow inlet.

3. The air valve of claim 1, wherein when the air valve is positioned on a pouring device placed on a container that is tilted to a pouring position, gravity overcomes the magnetic force and causes the weighted magnetic component to move away from the metal ball.

4. The air valve of claim 1, wherein the weighted magnetic component is freely slidable in the air valve channel.

5. The air valve of claim 1, wherein the air valve is configured to be secured to an end of a pouring device spout via tubing.

6. The air valve of claim 1, wherein the weighted magnetic component comprises a magnetic portion secured to a weighted metal component.

7. The pouring device of claim 6, wherein the metal ball comprises a steel ball.

8. A pouring device for a container for the dosing of liquid, the pouring device comprising:
    (a) a spout housing configured to seal an opening of the container;
    (b) a conduit extending through the spout housing for liquid passage through the housing;
    (c) an electrically operated valve disposed within the spout housing for selectively clamping the conduit so that a registerable amount of liquid can be dosed; and (d) an air valve configured to be secured to the spout housing, the air valve comprising
  (i) an air valve channel and an air vent tube, the air vent tube comprising an air flow inlet opening at one end;
  (ii) a weighted magnetic component comprising a magnet portion and a weighted portion; the weighted magnetic component positioned in the air valve channel;
  (iii) a metal ball positioned at the air inlet opening of the air vent tube;
wherein when the air valve is in an upright position, a magnetic force between the metal ball and the weighted magnetic component causes the metal ball to close the air inlet, and wherein when the air valve is tilted to a pouring position, the weighted magnetic component slides away from the metal ball, allowing air to flow into the air inlet.

9. The pouring device of claim 8, wherein the weighted magnetic component comprises a magnetic portion secured to a weighted metal component.

10. The pouring device of claim 8, wherein the air valve further comprises an air valve channel and wherein the weighted magnetic component is freely slidable in the air valve channel.

11. The pouring device of claim 8, wherein the air flow inlet is in fluid communication with an air vent tube and wherein the metal ball is configured to open and close air access to the air vent tube.

12. The pouring device of claim 8, wherein the metal ball comprises a steel ball.

13. The pouring device of claim 8, wherein when the container is titled into a pouring position, the weighted magnetic component overcomes the magnetic force, causing the component to slide away from the metal ball, releasing the metal ball and allowing opening of the air flow inlet.

14. The pouring device of claim 8, wherein the air valve further comprises an air valve channel and an air vent tube, the air vent tube comprising the air inlet opening at one end, wherein the weighted magnetic component slides freely in the air valve channel.

* * * * *